US008855932B1

(12) United States Patent
Lin et al.

(10) Patent No.: US 8,855,932 B1
(45) Date of Patent: Oct. 7, 2014

(54) METHOD AND APPARATUS FOR MEASURING SURFACE AIR PRESSURE

(75) Inventors: Bing Lin, Yorktown, VA (US); Yongxiang Hu, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 748 days.

(21) Appl. No.: 11/757,780

(22) Filed: Jun. 4, 2007

Related U.S. Application Data

(60) Provisional application No. 60/803,770, filed on Jun. 2, 2006.

(51) Int. Cl.
*G01W 1/00* (2006.01)

(52) U.S. Cl.
USPC ............... 702/3; 702/71; 702/75; 702/109; 702/189

(58) Field of Classification Search
USPC ............ 702/3, 71, 75, 109, 179, 189; 73/73, 73/159
See application file for complete search history.

(56) References Cited

U.S. PATENT DOCUMENTS

| 2,703,079 | A | 3/1955 | Argento |
| 3,380,055 | A | 4/1968 | Fow |
| 3,665,467 | A | 5/1972 | Haroules et al. |
| 3,935,460 | A | 1/1976 | Flint |
| 4,446,719 | A | * 5/1984 | Lambert ..................... 73/24.02 |
| 4,493,553 | A | 1/1985 | Korb et al. |
| 4,495,500 | A | * 1/1985 | Vickers ........................... 342/59 |
| 4,864,309 | A | 9/1989 | Wiley et al. |
| 4,873,481 | A | 10/1989 | Nelson et al. |
| 5,028,129 | A | 7/1991 | Smith |
| 5,055,692 | A | 10/1991 | Abbiss et al. |
| 5,065,615 | A | 11/1991 | Hill |
| 5,111,055 | A | 5/1992 | Fima |
| 5,526,676 | A | 6/1996 | Solheim et al. |
| 5,625,189 | A | 4/1997 | McCaul |
| 5,724,043 | A | 3/1998 | Savage et al. |
| 6,081,220 | A | 6/2000 | Fujisaka et al. |
| 6,456,226 | B1 | 9/2002 | Zheng et al. |
| 6,563,452 | B1 | 5/2003 | Zheng et al. |
| 6,568,260 | B2 | * 5/2003 | Hakenesch ................. 73/178 R |
| 6,590,661 | B1 | 7/2003 | Shnier |
| 6,894,768 | B2 | 5/2005 | Caldwell et al. |

OTHER PUBLICATIONS

Lin et al., 'Numerical Simulations of Radar Surface Air Pressure Measurements at O2 Bands', Jul. 2005, IEEE Publication, vol. 2, No. 3, pp. 324-328.*
Adelia C. Valdez, "An Analysis of Atmospheric Effects due to Atmospheric Oxygen on a Wideband Digital Signal in the 60 GHz Band," Virginia Tech (Blacksburg, VA, Jul. 2001), p. 1-93.

(Continued)

*Primary Examiner* — Elias Desta
(74) *Attorney, Agent, or Firm* — Andrea Z. Warmbier; Helen M. Galus

(57) ABSTRACT

The present invention is directed to an apparatus and method for remotely measuring surface air pressure. In one embodiment, the method of the present invention utilizes the steps of transmitting a signal having multiple frequencies into the atmosphere, measuring the transmitted/reflected signal to determine the relative received power level of each frequency and then determining the surface air pressure based upon the attenuation of the transmitted frequencies.

37 Claims, 2 Drawing Sheets

(56) References Cited

OTHER PUBLICATIONS

James C. Liljegren, "Microwave Radiometer Profiler Handbook," Argonne National Laboratory, p. 1-67, (Dec. 4, 2002).

M.S.P. Strandberg, C.Y. Meng, & J.G. Ingersoll, "The Microwave Absorption Spectrum of Oxygen," Research Laboratory of Electronics, Massachusetts Institute of Technology, p. 1-14, (Nov. 19, 1948).

J.H. Vanvleck, "The Absorption of Microwave by Oxygen," Physical Review Online Archives, Harvard University (Cambridge, Massachusetts), p. 1-1, (Apr. 1, 1947).

Tom Newman, "Millimeter-Wave Satellite Remote Sensing," Microwave Journal (Aug. 2005), p. 1-4.

Robert Beringer, "The Absorption of One-Half Centimeter Electromagnetic Waves in Oxygen," American Physcial Society, Physical Review Online Archives, , p. 1-1, (Jul. 1, 1946).

Cyrille N. Flamant, Geary K. Schwemmer, C. Laurence Korb, Keith D. Evans, & Stephen P. Palm, "Pressure Measurements Using an Airborne Differential Absorption Lidar," American Meteorological Society.

\* cited by examiner

METHOD AND APPARATUS FOR MEASURING SURFACE AIR PRESSURE

CROSS REFERENCE TO RELATED APPLICATIONS

This application claims the benefit of U.S. Provisional Application No. 60/803,770 filed Jun. 2, 2006. The entire disclosure of the aforesaid provisional application is herein incorporated by reference.

STATEMENT OF GOVERNMENT INTEREST

The invention described herein may be manufactured and used by or for the Government of the United States of America for Governmental purposes without payment of any royalties thereon or therefore.

BACKGROUND OF THE INVENTION

1. Field of the Invention

The present invention relates to a method and apparatus for remotely measuring surface air pressure.

2. Description of Related Art

Surface air pressure is one of the most important parameters regularly measured at surface meteorological stations. With development of remote sensing methods, especially in airborne and satellite remote sensing techniques, large-scale and global surface pressure measurements significantly lag behind other important parameters, such as surface temperature. One known technique uses satellite oxygen A-band methods to measure surface air pressure. The aforesaid known oxygen A-band methods are either passive, or rely upon active instruments. The active instruments rely on the operation of complicated highly stable laser systems on a space platform and are thus, technically difficult to implement. On the other hand, the passive methods are restricted to daytime measurements and areas of low cloud cover.

A review of issued U.S. patents reveals several techniques to measure atmospheric air pressure, temperature and moisture. Fema, U.S. Pat. No. 5,111,055 discloses a method and system for the optical measurements of the air pressure by laser excitation, particularly in front of an aircraft. Korb et al., U.S. Pat. No. 4,493,553 discloses a method and apparatus for measuring temperature and pressure that uses a laser beam. Fujisaka et al., U.S. Pat. No. 6,081,220 discloses a radar system for observing weather phenomena. Argento, U.S. Pat. No. 2,703,079 discloses a method of and apparatus for determining the oxygen content of a gas. Shnier, U.S. Pat. No. 6,590,661 discloses optical methods for selectively sensing remote vocal sound waves. Nelson et al., discloses a microwave radiometer and methods for sensing atmospheric moisture and temperature. McCaul et al., U.S. Pat. No. 5,625,189 discloses a technique using gas spectroscopy that entails generating laser radiation, passing the laser radiation through a volume containing human breath multiple times, and detecting the laser radiation that is not absorbed by gases in the volume.

None of these known techniques provide a reliable, accurate, cost effective and active system to remotely sense measurements of surface air pressure.

SUMMARY OF THE INVENTION

Accordingly, it is an object of the present invention to provide methods and apparatus to accurately and reliably measure surface air pressure from a remote location.

It is another object of the present invention that the aforesaid apparatus and method can be implemented at reasonable cost.

Other objects, advantages and features of the present invention will be apparent from the ensuing description and the accompanying drawings.

In at least one embodiment of the present invention, the apparatus is comprised of an active microwave radar system that operates at moderate to strong $O_2$ absorption bands (between about 5.3-6.0 millimeter wavelengths (i.e., about 50-56 GHz) in order to effect remote sensing of surface air pressure. The active microwave system consists of a dual (or multiple) frequency channel 02 band radar apparatus. Accordingly, two frequency channels (or more) are used to determine the relative received power (RRP) ratios of the two different wavelength echoes. The dual-wavelength channels have very similar water vapor (WV) and liquid water (LW) absorption characteristics and illumination footprints. Thus, the microwave absorption effects due to LW and WV are effectively removed from the ratio of reflected radar signals of the two channels. The relative received power values of the two different wavelength signals are processed to determine the differential absorption index that has a near-linear relationship with surface air pressure.

In accordance with at least one embodiment of the present invention, two wavelength signals are transmitted into the atmosphere so as to produce altered (e.g., reflected) signals. A receiver collects the returned signals and the received power value for each wavelength is then determined. A predetermined algorithm uses the power values of the received signals to determine the differential absorption index and the corresponding surface air pressure.

In one embodiment, the apparatus of the present invention comprises a transmitter to transmit a signal having multiple frequencies into the atmosphere so as to produce altered signals, a receiver to receive the altered signals, and a processing resource to determine the altered power value for each wavelength and then use the determined received power values to determine the differential absorption index and the corresponding surface air pressure.

In another embodiment, the apparatus of the present invention comprises an active radar apparatus for measuring surface air pressure, comprising a transmitter system to transmit a first signal having a first frequency into the atmosphere and a second signal having a second frequency into the atmosphere so as to produce first and second received signals, respectively, a transmitting antenna to direct the first and second signals into the atmosphere and a receiving antenna to receive the first and second received signals. In this embodiment, the active radar apparatus further comprises a receiver system having signal processing components to process the received first and second received signals, an analog-to-digital converter resource to convert the processed, first and second received signals to digital data, and a computer programmed with a predetermined algorithm that performs numerical computations on the digital data to determine the relative received power of the first and second received signals, the differential absorption index and the corresponding surface air pressure. The active radar apparatus can further comprise a display device to display the determined differential absorption index and the determined corresponding surface air pressure

BRIEF DESCRIPTION OF THE DRAWINGS

The features of the invention are novel. The figures are for illustration purposes only and are not drawn to scale. The invention itself, however, both as to organization and method of operation, may best be understood by reference to the detailed description which follows taken in conjunction with the accompanying drawings in which.

DESCRIPTION OF THE EMBODIMENTS

Figure 1:
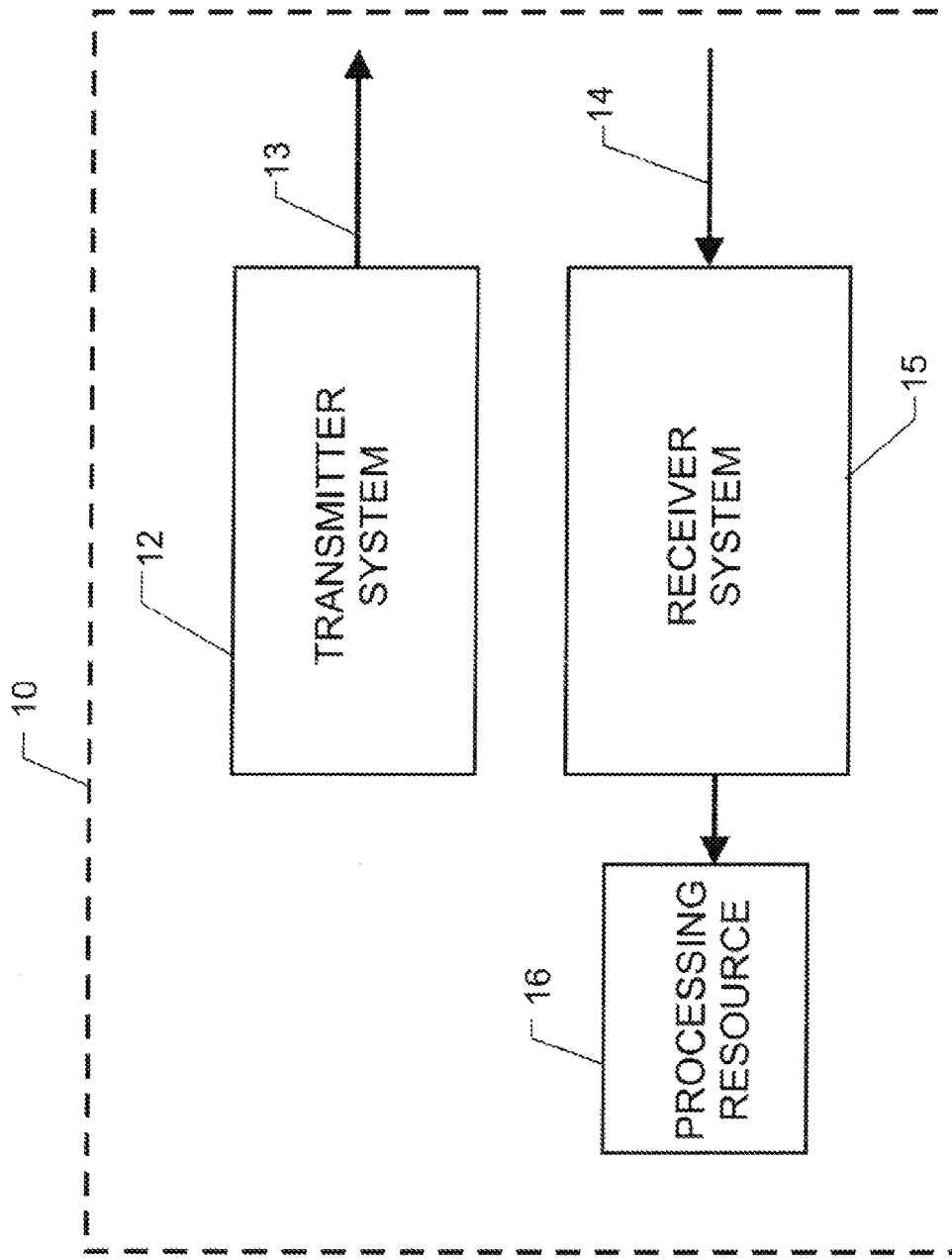
FIG. 1 is a general block diagram of an apparatus for measuring surface air pressure in accordance with one embodiment of the present invention.

Referring to FIG. 1, there is shown a general block diagram of apparatus 10 of the present invention which measures surface air pressure. In accordance with at least one embodiment of the invention, apparatus 10 comprises an active microwave radar system that operates at strong $O_2$ absorption bands (between about 50-56 GHz) in order to effect remote sensing of surface air pressure. The active microwave radar system consists of a dual (or multiple) frequency channel $O_2$ band radar apparatus. In an advantageous embodiment, apparatus 10 is configured as an airborne active microwave radar system. However, apparatus 10 can also be easily configured for other situations, such as ground-based or space-borne situations. Apparatus 10 generally comprises transmitter system 12, as known in the art, to transmit signals 13 into the atmosphere. These signals may be transmitted simultaneously or serially. These signals (13) propagate through the atmosphere (either directly to or via reflection to a receiving system) and are altered by the atmosphere, producing signal 14. Although transmission and bi-static embodiments are also envisioned, the apparatus embodied in FIG. 1 represents a monostatic configuration; as such, it receives signals 14 reflected by the atmosphere, terrain/ocean surface, or man-made objects.

Apparatus 10 further comprises receiver system 15, as known in the art, which receives the aforesaid reflected signals 14. Receiver system 15 can include signal-processing components that amplify, demodulate and filter received reflected signals 14. As shown, receiver system 15 outputs processed signals that are then directed into processing resource 16. Processing resource 16 processes the signals with a predetermined algorithm to calculate the surface air pressure. Processing resource 16 executes the predetermined algorithm using the measured power levels of the received reflected signals to generate the differential absorption index and the corresponding surface air pressure. Processing resource 16 can also use predetermined data such as system losses and gains of transmitter system 14 and receiver system 15 in determining the power levels of the received reflected signals, the differential absorption index, and surface air pressure.

The transmitted radar wavelengths 13 are chosen such that the primary differential factor affecting signal attenuation is the difference in oxygen absorptions along the signal path. By selecting two radar wavelengths, $\lambda_1$ and $\lambda_2$ (signals 13), that are not significantly different, the surface radar backscattering coefficient and system gain effects can be made insignificant as variables in the received signal strength. Additionally, if these wavelengths are chosen so that their liquid water absorption coefficients and water vapor absorption coefficients are very similar, then the ratio of radar received powers from these two channels is represented by Equation (1):

$$P_r(\lambda_1)/P_r(\lambda_2) = [C(\lambda_1)/C(\lambda_2)]\exp[-(2(\alpha_o(\lambda_1)) - \alpha_o(\lambda_2)) M_o P_0)/g] \quad (1)$$

This ratio is dominantly determined by the surface air pressure $P_0$. The temperature and pressure dependencies of the effective $O_2$ absorption coefficients have secondary influences on the spectrum power ratio. Rearranging Equation (1) so that the surface air pressure $P_0$ is a function of the radar power ratio yields Equation (2):

$$P_0 = C_0(\lambda_1,\lambda_2) + C_1(\lambda_1,\lambda_2)\log_e(P_r(\lambda_1)P_r^{-1}(\lambda_2)) = C_0(\lambda_1,\lambda_2) + C_1(\lambda_1,\lambda_2)Ri(\lambda_1,\lambda_2) \quad (2)$$

where $C_0$ and $C_1$ are the wavelength dependent coefficients of the relationship between the radar power ratio and surface air pressure, and can be estimated from the radar measurements or theoretical calculations of the radar system design. The $Ri(\lambda_1,\lambda_2)$ value is the logarithm of the radar power ratio at wavelengths $\lambda_1$ and $\lambda_2$, referred to herein as the "differential absorption index." As can be seen from Equation (2), a very simple near-linear relationship between surface air pressure and the differential absorption index is expected from $O_2$ band radar data. Thus, in accordance with the invention, the surface air pressure is determined by a linear regression.

Processor 16 is also programmed with predetermined data such as known system losses and gains, e.g. insertion loss, antenna gain, amplifier gain, waveguide loss, receiver processor gain, etc. Processor 16 uses such predetermined data when determining transmitted and received power levels and ratios of relative received powers and differential absorption index.

Figure 2:
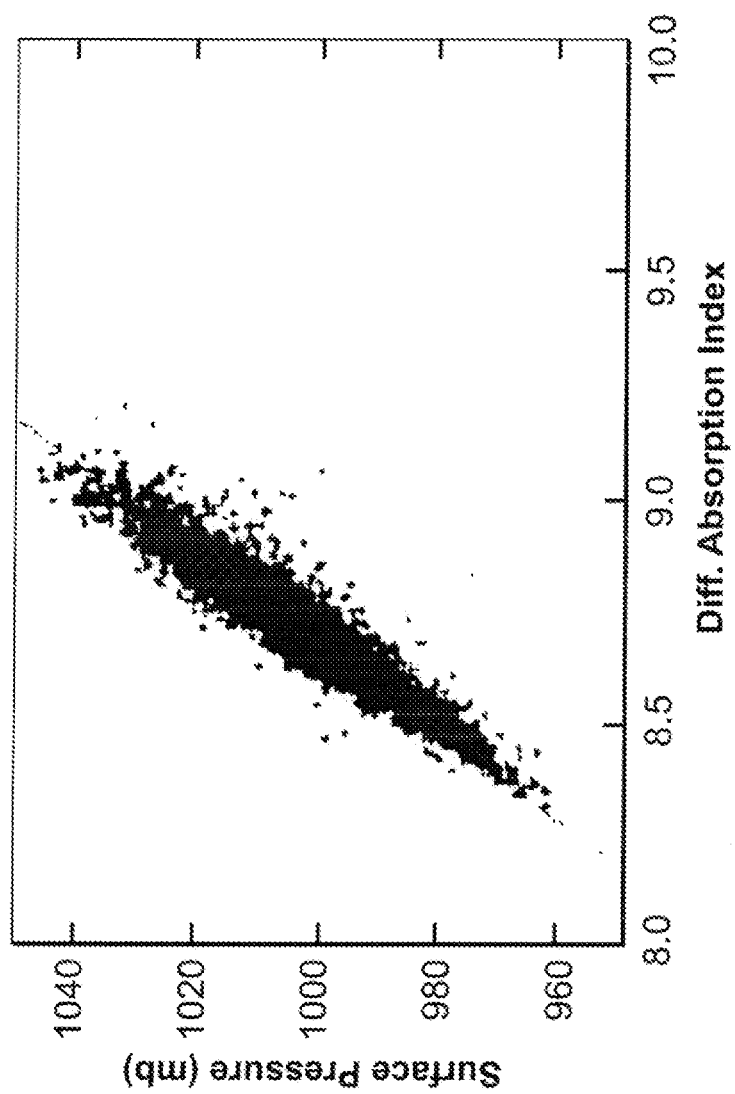
FIG. 2 is a graph showing a curve of differential absorption index versus surface air pressure for two particular radar frequency wavelengths.

Simulation of the technique of the present invention has shown that the root mean square (rms) error of the radar surface-pressure can be as low as about 4-7 mb, under both clear and cloudy conditions, given a 15 dB signal-to-noise ratio. FIG. 2 shows the simulated relationship between the differential absorption index at two representative wavelengths and surface air pressure. The rms error is about 4.1 mb.

The present invention may be implemented with commercially available radar and RF components, antennae, and signal processing components. Furthermore, the present invention can be adapted for airborne or space-borne scenarios to monitor surface pressure fields. The present invention has many applications, including weather observations, numerical weather forecasts, and tropical storm intensity and track predictions. The low rms error has significant advantages, especially with respect to predicting the tracks of tropical storms. For example, it has been found that low rms values between about 4-7 mb can reduce the tropical storm tracking error from 350 km to 100 km or less for a three-day forecast.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for remotely measuring surface air pressure, comprising:
    transmitting signals at two different wavelengths into the atmosphere to produce altered signals;
    receiving the altered signals; and
    processing the received signals to determine the relative received power of the signals, to calculate the differential absorption index and the corresponding surface air pressure.

2. The method according to claim 1 wherein the step of transmitting comprises synthesizing the two different wavelength signals.

3. The method according to claim 2 further comprising the step of modulating, filtering and amplifying the synthesized signals.

4. The method according to claim 1 wherein the altered signals are reflected signals.

5. The method according to claim 1 wherein the step of transmitting the two different wavelength signals further comprises the step of directing the transmitted signals into the atmosphere.

6. The method according to claim 1 wherein the step of receiving the altered signals further comprises the step of amplifying the altered signals.

7. The method according to claim 6 wherein the step of receiving the altered signals further comprises the steps of down-converting the received signals to produce signals having two different intermediate wavelengths.

8. The method according to claim 7 further comprising the step of filtering the two different intermediate wavelength signals to remove all frequency components below a first predetermined cutoff frequency.

9. The method according to claim 8 further comprising amplifying the two different intermediate wavelength signals.

10. The method according to claim 9 further comprising filtering the two different intermediate wavelength signals to remove all frequency components above a second predetermined cutoff frequency.

11. The method according to claim 10 wherein the step of processing comprises the steps of:
converting the filtered intermediate wavelength signals into digital data signals; and
processing all digital data signals to determine the relative received power of the received altered signals.

12. A method for measuring surface air pressure, comprising:
transmitting a signal having multiple frequencies into the atmosphere so as to produce an altered signal;
receiving the altered signal;
measuring the relative received power of each frequency of the altered signal; and
determining the surface air pressure based on the determined relative received power of each frequency of the altered signal.

13. An apparatus to measure surface air pressure, comprising:
a transmitter system to transmit signals having two different wavelengths into the atmosphere to produce altered signals;
a receiver system to receive the altered signals; and
a processing resource to process the received signals to determine the relative received power of the received signals, the differential absorption index and corresponding surface air pressure.

14. The apparatus according to claim 13 wherein the altered signals are reflected signals.

15. The apparatus according to claim 13 wherein the transmitter system further comprises an antenna for directing the transmitted signals into the atmosphere.

16. The apparatus according to claim 13 wherein the receiver system further comprises an antenna for receiving the altered signals.

17. The apparatus according to claim 13 wherein the receiver system further comprises demodulating components to demodulate the altered signals.

18. The apparatus according to claim 17 wherein the processing resource further comprises an analog-to-digital converter resource to convert the demodulated signals into digital data signals.

19. The apparatus according to claim 18 wherein the processing resource further comprises a microprocessor that executes a predetermined program on the digital data signals to generate relative received power values of the altered signals, differential absorption index and corresponding surface air pressure.

20. An active radar apparatus for measuring surface air pressure, comprising:
a transmitter system to transmit a first signal having a first frequency into the atmosphere and a second signal having a second frequency into the atmosphere so as to produce first and second reflected signals, respectively;
the transmitter system having a transmitting antenna to direct the first and second signals into the atmosphere;
a receiver system having a receiving antenna to receive the first and second reflected signals and signal processing components to process the received first and second signals; and
a processing resource comprising an analog-to-digital converter resource to convert the processed received first and second reflected signals to digital data signals, and a computer programmed with a predetermined algorithm that performs numerical computations on the digital data signals to determine relative received power values of the received first and second reflected signals, the differential absorption index and the corresponding surface air pressure.

21. The apparatus according to claim 20 wherein the processing resource further comprises a display device to display the determined differential absorption index and corresponding surface air pressure.

22. A method for remotely measuring surface air pressure, comprising:
transmitting a signal having multiple frequencies into the atmosphere to produce an altered signal;
receiving the altered signal; and
processing the received signal to determine the relative received power of each frequency of the altered signal to calculate the differential absorption index and the corresponding surface air pressure.

23. The method according to claim 22 wherein the step of transmitting comprises synthesizing a signal having multiple frequencies.

24. The method according to claim 22 wherein the received altered signal is a reflected signal.

25. The method according to claim 23 further comprising the steps of modulating, filtering, and amplifying the synthesized signal.

26. The method according to claim 22 wherein the step of transmitting the signal having multiple frequencies comprises the step of directing the transmitted signal into the atmosphere for propagation directly to or via reflection to a receiving system.

27. The method according to claim 22 wherein the step of receiving the altered signal further comprises the step of amplifying the altered signal.

28. The method according to claim 27 wherein the step of receiving the altered signal further comprises the steps of performing at least one of: filtering, down-converting, amplifying, and processing the received reflected signal to facilitate measurement of relative signal power of each frequency.

29. The method according to claim 28 wherein the step of processing comprises the steps of:

detecting the received signal and converting it into a digital data signal; and processing the digital data signal with a predetermined algorithm that performs numerical computations on the digital data signal to determine relative received power values of each frequency, the differential absorption index and the corresponding surface air pressure.

30. The method according to claim 29 further comprising the step of displaying the determined differential absorption index and corresponding surface air pressure.

31. An apparatus to measure surface air pressure, comprising:

a transmitter system to transmit a signal having multiple frequencies into the atmosphere to produce and altered signal;

a receiver system to receive the altered signal; and a processing resource to process the received signal to determine the relative received power of each frequency of the altered signal, the differential absorption index and corresponding surface air pressure.

32. The apparatus according to claim 31 wherein the altered signal is a reflected signal.

33. The apparatus according to claim 31 wherein the transmitter system further comprises an antenna for directing the transmitted signals into the atmosphere.

34. The apparatus according to claim 31 wherein the receiver system further comprises an antenna for receiving the altered signal.

35. The apparatus according to claim 31 wherein the receiver system further comprises demodulating components to demodulate the altered signal.

36. The apparatus according to claim 35 wherein the processing resource further comprises an analog-to-digital converter resource to convert the demodulated signal into a digital data signal.

37. The apparatus according to claim 36 wherein the processing resource further comprises a microprocessor that executes a predetermined program on the digital data signal to generate relative received power values of each frequency of the altered signal, differential absorption index and corresponding surface air pressure.

* * * * *